O. H. ANDERSON.
RESILIENT WHEEL.
APPLICATION FILED JUNE 28, 1910.
981,515.  Patented Jan. 10, 1911.
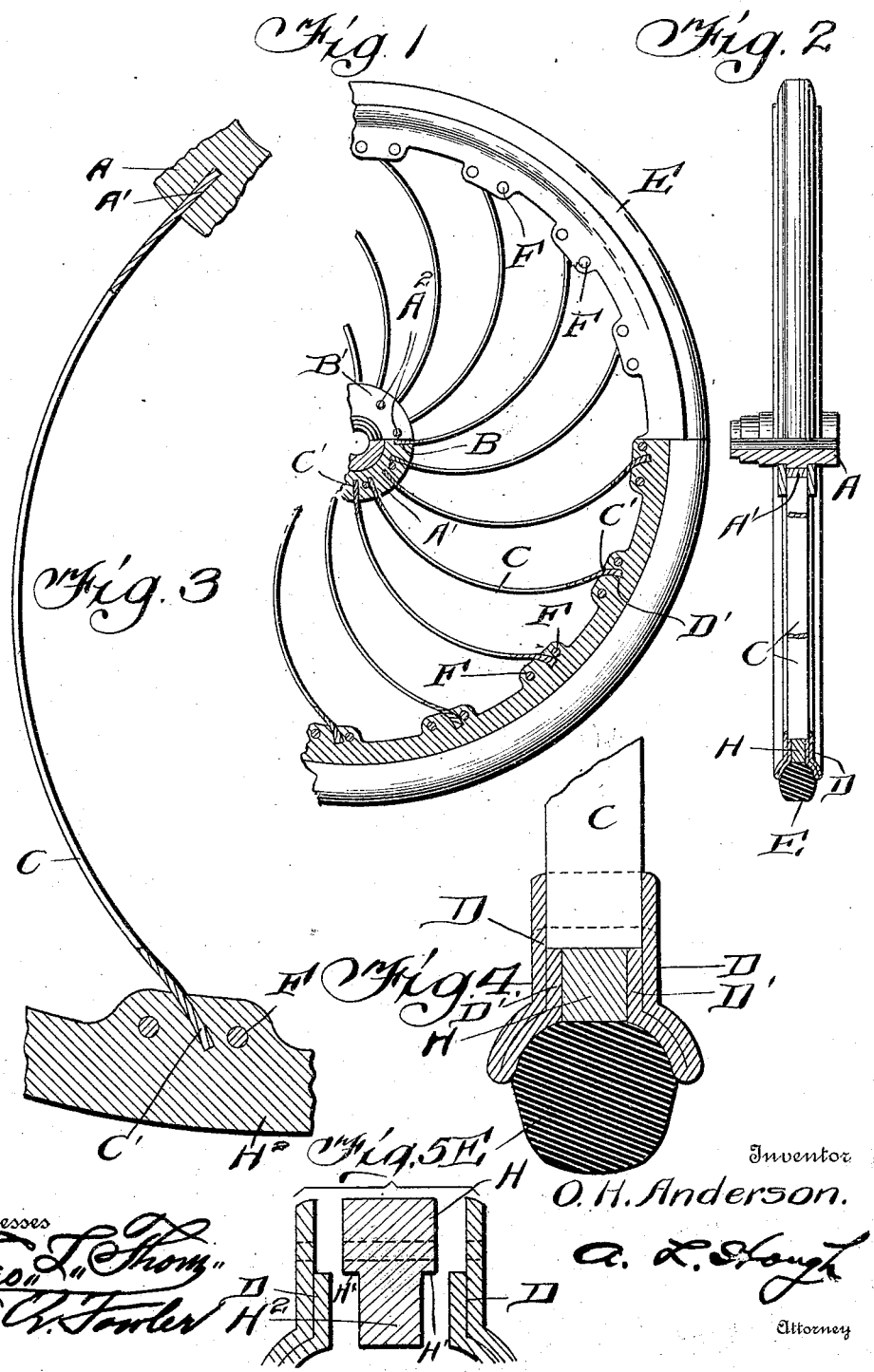

UNITED STATES PATENT OFFICE.

OLIVER HAMILTON ANDERSON, OF SPARTA, TENNESSEE, ASSIGNOR OF ONE-FOURTH TO G. I. FRAZIER AND ONE-FOURTH TO J. T. TIMBERLAKE, BOTH OF NASHVILLE, TENNESSEE.

RESILIENT WHEEL.

981,515.

Specification of Letters Patent. Patented Jan. 10, 1911.

Application filed June 28, 1910. Serial No. 569,387.

*To all whom it may concern:*

Be it known that I, OLIVER HAMILTON ANDERSON, a citizen of the United States, residing at Sparta, in the county of White and State of Tennessee, have invented certain new and useful Improvements in Resilient Wheels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in resilient or spring wheels, the object in view being to produce a simple and efficient device of this nature so arranged that the vibration incident to the wheels rotating will be taken up, affording a suitable substitute for the pneumatic tire wheels commonly in use.

More specifically the invention comprises a resilient wheel, the rim of which is provided with series of dove-tail openings adapted to receive correspondingly shaped ends of the resilient spokes and in the provision of stamping plates bent upon themselves, a portion of each being adapted to engage the rim and the edge of the spoke in such a manner as to securely hold the parts rigidly and firmly.

The invention comprises various details of construction and combinations and arrangements of parts which will be hereinafter fully described and then specifically defined in the appended claims.

I illustrate my invention in the accompanying drawings, in which:—

Figure 1 is a side elevation of a portion of the wheel embodying my invention, part of the wheel being cut away to better illustrate the detailed construction. Fig. 2 is an edge view of a wheel partially in section. Fig. 3 is an enlarged detail sectional view showing the manner of connecting the ends of the spokes respectively to the hub and the rim, Fig. 4 is an enlarged detail cross sectional view through the tire, rim and clamping plates, and Fig. 5 is a sectional view showing the clamping plates and rim disassembled.

Reference now being had to the details of the drawings by letter, A designates a hub which may be of one piece or of sections, as may be desired, and upon the circumference of said hub is a ring A' provided with dove-tail shaped grooves adapted to receive the inner ends C' of the spoke C, which inner ends are of shapes adapted to conform to the grooves in which they are seated.

Clamping rings, designated by letter B', are adapted to be held by bolts A² in clamping relation against the opposite edges of the ring A' and also the edges of the resilient spokes C.

The rim of the wheel is designated by letter H, a section of which is illustrated in Fig. 5, and is provided with oppositely disposed shoulders H'. Said rim at the locations where the outer ends of the spokes communicate is widened, as shown clearly in Figs. 1 and 3 of the drawings, and each of said widened portions is provided with a dove-tail groove disposed at an inclination and adapted to receive the outer flaring end C' of the spoke C. Upon reference to Fig. 4 of the drawings, it will be noted that the opposite edges of the outer dove-tail end of each spoke extends beyond the contracted part H² of the rim and the opposite edges of the spoke are flush with the inner wider portion of the rim.

Rim plates, designated by letter D, formed of any suitable material, such as steel, are bent upon themselves in the manner shown in Fig. 4 of the drawings, one end D' of each plate being bent concaved to coöperate with the circumference of the rim to form a seat for the tire E with the inner face of said end D' bearing against the side of the contracted part of the rim and its inner end bearing against the shoulder upon the rim and the end of the spoke. The outer portion of each plate, which is bent against the inner portion, is adapted to be held in clamping relation against the face of the widened portion of the rim and the edge of the spoke and held in such relation by means of bolts F.

By the provision of a resilient wheel made in accordance with my invention, it will be noted that a device is afforded whereby the ends of the spokes may be securely fastened to the rim and affording a secure means for receiving the cushion tire of the wheels. By the construction illustrated, vibration will be taken up by the spokes and a substitute offered for a pneumatic tire.

What I claim to be new is:—

1. A resilient wheel comprising a hub, spokes fastened thereto, a rim having a series of diagonally disposed dove-tail grooves formed in the inner periphery thereof, the outer ends of the spokes having dove-tail connection with said grooves, said rim having shoulders upon its opposite faces, clamping plates bent upon themselves and having portions thereof engaging opposite edges of the spokes and said shouldered portions of the rim, the portions of said plates which are bent upon themselves being curved to form a groove to receive a tire.

2. A resilient wheel comprising a hub, spokes fastened thereto, a rim having transversely and diagonally disposed dove-tail grooves formed in its inner periphery, the outer portion of the rim being contracted and terminating in a shoulder, the outer portions of said spokes having dove-tail connections with the grooves of the rim and having their ends flush with said shoulders, clamping plates bent upon themselves, a portion of the inner face of each clamping plate bearing against the face of the rim and edge of a spoke with the inturned end of the plate bearing against the end of the spoke and shoulder and its flat face against the contracted portion of the rim, portions of the plates which are bent upon themselves forming a groove for the reception of a tire.

In testimony whereof I hereunto affix my signature in the presence of two witnesses.

OLIVER HAMILTON ANDERSON.

Witnesses:
 I. L. NAULLIN,
 MARCH ANDERSON.